Figure 1:
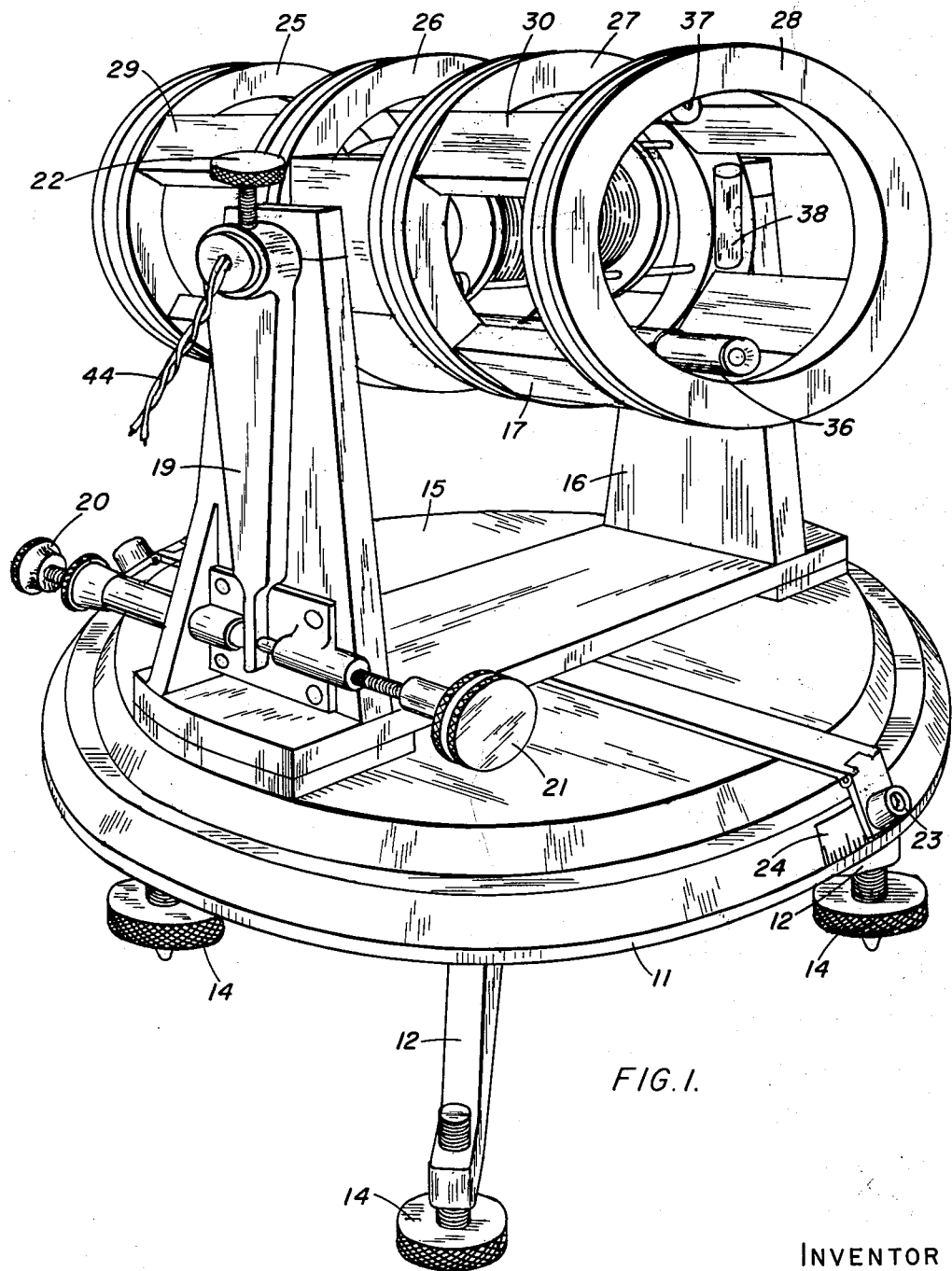

INVENTOR
PAUL H. SERSON
BY Smart - Biggar
ATTORNEYS.

Dec. 10, 1963   P. H. SERSON   3,114,103
METHOD OF MAKING AN ELECTROMAGNETIC MEASUREMENT
Filed June 27, 1960   2 Sheets-Sheet 2
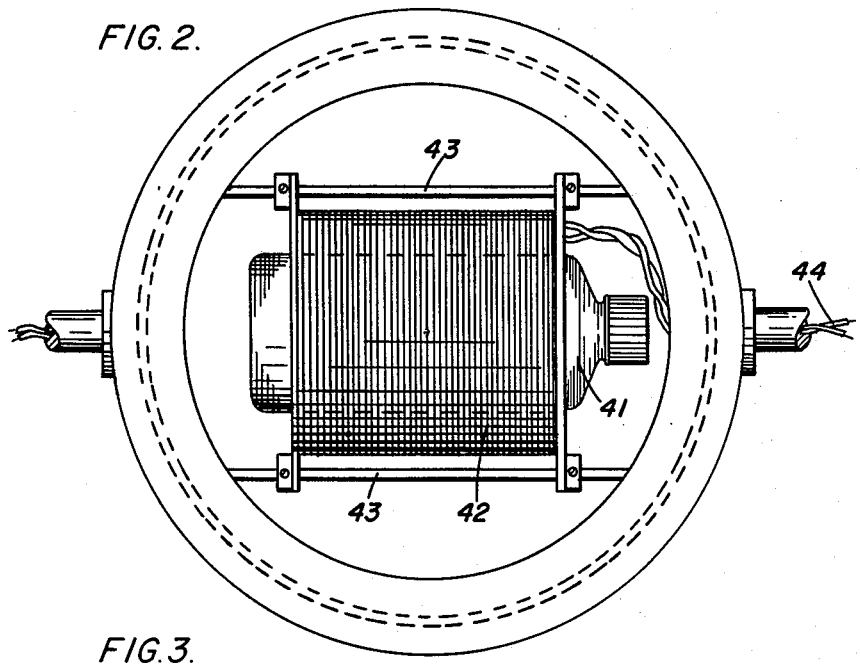
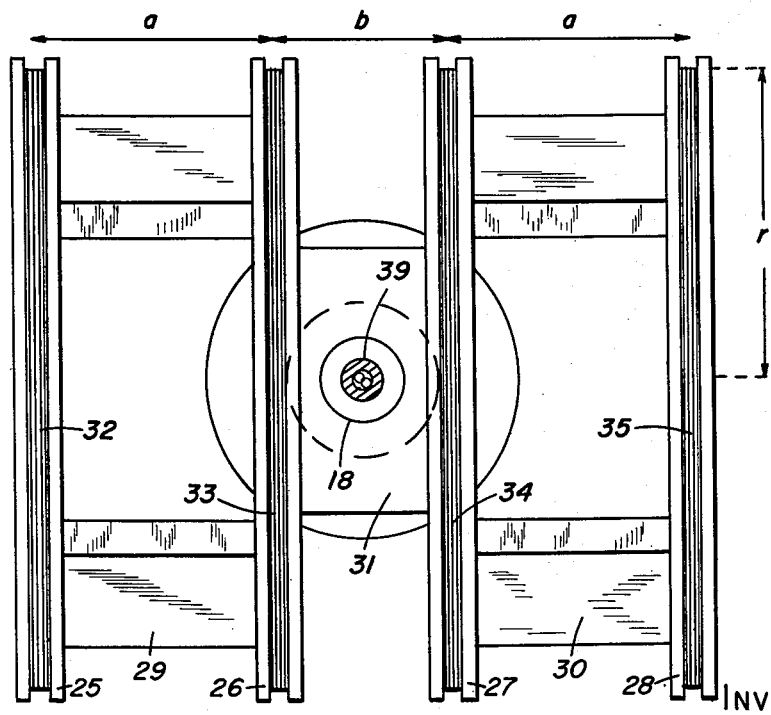
INVENTOR
PAUL H. SERSON
BY *Smart & Biggar*
ATTORNEYS.

United States Patent Office 3,114,103
Patented Dec. 10, 1963

3,114,103
METHOD OF MAKING AN ELECTROMAGNETIC MEASUREMENT
Paul H. Serson, Ottawa, Ontario, Canada, assignor to Her Majesty the Queen in right of Canada as represented by the Minister of Mines and Technical Surveys
Filed June 27, 1960, Ser. No. 39,077
13 Claims. (Cl. 324—.5)

This invention relates to a method of making an electromagnetic measurement.

It is desirable in many scientific applications to determine a component of a magnetic field to a high degree of accuracy. Also, it is frequently desirable to determine the magnitude of a direct current by measuring the magnetic field which the current produces when flowing through precisely determined geometrical configurations of wire.

Most magnetometers known in the art measure a component of the magnetic field rather than the total field intensity (unless, of course, the magnetometer is aligned in such a way that the total field is in the same direction as the measured component, in which case the component and the total field are identical). However, atomic precession magnetometers are adapted to measure the total magnetic field rather than a component of the field in any particular direction. The atomic precession magnetometer makes use of the fact that atomic and sub-atomic particles (e.g. protons) of certain substances will precess in a magnetic field. The frequency of precession is a measure of the field intensity. The field intenstiy is related to the frequency of precession by the equation $$F = \frac{2\pi f}{\gamma} \qquad (1)$$

where F is the total magnetic intensity, $f$ is the frequency of precession, and $\gamma$ is the gyromagnetic ratio of the substance whose particles are precessing. Thus a measure of precession frequency, which can be made with great accuracy, gives a value of F in terms of the gyromagnetic ratio. The gyromagnetic ratio is an atomic constant which is about as close as man can come to an "absolute" constant. Thus measurements of magnetic field intensity can be made with relatively high accuracy. Further, since the frequency measurement conveniently results in a number in digital form, precession methods are naturally suited to automatic recording and computation by a digital computer.

Accordingly, it would be desirable to adapt the atomic precession magnetometer to measure any desired component of a magnetic field as well as the total field, rather than to use other types of component-measuring magnetometers which are not capable of the accuracy and ease of which measurement of the atomic precession magnetometer is capable. This has been done prior to the present invention by cancelling the components in the plane perpendicular to the component of interest, by means of an accurately adjusted current flowing through a carefully calibrated Helmholtz coil or other suitable coil system. To measure the vertical component of the earth's magnetic field, for example, the precession sample, i.e. the sample of matter whose particles precess in a magnetic field, is placed within a Helmholtz coil structure. The coil structure is carefully aligned in the direction of the horizontal component of the earth's field, and a direct current is passed through the coil which is just sufficient to produce a horizontal field equal and opposite to the horizontal component of the earth's field. A measurement is then taken of the precession frequency of the particles in the sample. Since the resultant total field is simply the vertical component of the earth's field, this vertical field intensity may be determined from Equation 1. All methods of measuring component fields require careful alignment and cailbration of the Helmholtz coil. The aforementioned method has the additional disadvantage that careful calibration of the direct current flowing through the coil is required.

The present invention overcomes the aforesaid additional disadvantage by providing a method for measuring a component of a magnetic field using an atomic precession magnetometer or other magnetometer adapted to measure total magnetic intensity without the necessity of careful calibration of the direct current. According to the invention, a Helmholtz coil structure or other coil structure is provided which is capable of producing a uniform magnetic field in any desired direction. The sensitive head of the magnetometer is placed within the coil structure, and three readings of total magnetic field are taken—one with no current flowing through the Helmholtz or other coil, one with an arbitrary current flowing through the coil in one direction, and one with the same current flowing through the coil in the opposite direction. The value of the component of the quiescent field (i.e., the field existing in the absence of any auxiliary field) in the same direction as the field produced by the flow of current through the coil is then calculated from the equation $$P = \frac{F_1^2 - F_2^2}{4\sqrt{\frac{F_1^2 + F_2^2}{2} - F^2}} \qquad (2)$$

where P is the component to be measured (with no current flowing in the Helmholtz or other coil), F is the total intensity of the magnetic field with no current flowing in the coil, $F_1$ is the total intensity of the magnetic field with current flowing through the coil in one direction, and $F_2$ is the total intensity of the magnetic field with the same current flowing through the coil in the opposite direction.

It will be readily seen that the value of the direct current or the field produced by its flow through the coil does not enter into the determination of the component field. The reason for this is as follows.

The total quiescent magnetic field intensity is given by $$F^2 = P^2 + Q^2 + R^2 \qquad (3)$$

where F and P have been defined previously, and Q and R are the two field components at right angles to P.

When a current passes through the Helmholtz coil, an auxiliary field $p$ is produced in the same direction as P (or the opposite direction). The resultant total field $F_1$ is then given by $$F_1^2 = (P+p)^2 + Q^2 + R^2 \qquad (4)$$

When the current is reversed, the resultant total field $F_2$ is given by $$F_2^2 = (P-p)^2 + Q^2 + R^2 \qquad (5)$$

(4)—(5) gives $$P = \frac{F_1^2 - F_2^2}{4p} \qquad (6)$$

(4)+(5)—(3) gives $$p^2 = \frac{F_1^2 + F_2^2}{2} - F^2 \qquad (7)$$

whence $$P = \frac{F_1^2 + F_2^2}{4\sqrt{\frac{F_1^2 + F_2^2}{2} - F^2}} \qquad (2)$$

Equation 7 shows that the magnetic field $p$ produced by the flow of direct current through the coil may be calculated from the same three readings of total intensity F, $F_1$, $F_2$ as are used for the determination of P. Thus by taking three readings of total magnetic intensity, the magnitude of the direct current flowing through the coil can be determined, provided the equation relating the direct current flowing through the coil to the field produced by it is known. Certain coil configurations (such as the Helmholtz coil) are known which yield a simple relationship between current and magnetic field and in addition produce a uniform magnetic field over a sufficiently large region of space. Such configurations are useful for measuring direct current by the aforementioned method.

If a proton precession magnetometer is used for measuring the total magnetic intensity, the same procedure as is used for measuring direct currents accurately may be used to determine the gyromagnetic ratio of unknown nuclei. In this method, an accurately determined direct current is passed through the coil first in one direction and then in the opposite direction. The unknown nuclei are used as the precession sample, and measurements of precession frequency are made with the direct current flowing in each direction and with no direct current flowing in the coil. From the geometrical configuration of the coil, the field $p$ produced by the current is known. From Equation 1 it is apparent that $$f_1 = \frac{1}{2\pi} \gamma F_1 \qquad (8)$$

$$f_2 = \frac{1}{2\pi} \gamma F_2 \qquad (9)$$

$$f = \frac{1}{2\pi} \gamma F \qquad (10)$$

where F, $F_1$, $F_2$ and $\gamma$ have been defined before, and $f$, $f_1$, $f_2$ are the precession frequencies corresponding to fields F, $F_1$, $F_2$. In Equations 8, 9 and 10 there are four unknown variables $F_1$, $F_2$, F and $\gamma$. If Equation 7 is now added, four equations with four unknowns are obtained, and thus a solution for $\gamma$ may be obtained. If Equations 7, 8, 9 and 10 are solved simultaneously, it will be found that $$\gamma = \sqrt{\frac{2\pi^2}{p^2}(f_1^2 + f_2^2 - 2f^2)} \qquad (11)$$

The invention will now be described with reference to the accompanying drawings, in which:

FIGURE 1 is a perspective view of an instrument adapted to be used for the determination of a component of a magnetic field, FIGURE 2 is a view of the precession sample of an atomic precession magnetometer within the coil structure shown in FIGURE 1, and FIGURE 3 is a side view of the coil structure shown in FIGURE 1.

FIGURE 1 shows apparatus which may be used for the measurement of a component of a magnetic field, the gyromagnetic ratio of an atomic particle, or the magnitude of a direct current. The apparatus shown was designed specifically for the determination of components of the earth's magnetic field. As can be easily perceived, the device is very similar to an ordinary surveyor's transit. A circular base 11 has tripod legs 12 in which are screwed levelling screws 14. A circular plate 15 is adapted to be rotated with respect to the base 11. Firmly mounted on the plate 15 is a U-frame 16 which supports a coil structure 17 by means of an axle 18 (see FIGURE 3) which is firmly attached to the coil structure 17 but can rotate freely in bearings (not shown) on each arm of U-frame 16. The axle 18 may be firmly clamped to a fine adjustment arm 19 by means of a clamping screw 22. Fine adjustment of the motion of the coil structure 17 about axle 18 is then obtained by adjusting fine adjustment screws 20 and 21. A similar fine adjustment means (not shown) provides fine adjustment of the plate 15 with respect to the base 11. A magnifying eye piece 23 enables the operator to read scale 24, which indicates the horizontal angle of the axis of the coils.

The coil structure 17 (see also FIGURE 3) consists of coil supports 25, 26, 27 and 28 which are spaced apart by spacers such as 29, 30 and 31. Coils of wire 32, 33, 34 and 35 are wound around the coil supports 25, 26, 27 and 28. Rigidly mounted on the coil structure 17 are a telescope 36 and level bubbles 37 and 38. When the level bubble 37 indicates a level position, the magnetic field produced by current flowing through the coils 32, 33, 34 and 35 is horizontal. When the coil system has been rotated through 90° in a vertical plane and the level bubble 38 indicates a level position, the magnetic field produced by the coils 32, 33, 34 and 35 is vertical if the levelling screws 14 are adjusted correctly (i.e. so that with level bubble 37 indicating a level position, any rotation of plate 15 will leave the bubble 37 in a level position). The telescope 36 allows the axis of the coils to be aligned with external points.

The coil structure 17 must be carefully constructed so that a uniform magnetic field can be produced by the coils 32, 33, 34 and 35 within the coil structure. The magnetic field should be in the direction of the axis of the four coils. The four coils are connected in series so that their fields do not oppose one another within the coil structure and are connected to leads 40 which are conveniently run through a hole 39 in the axle 18. Instead of the four-coil structure shown, a Helmholtz coil might be used, or any other system of coils which yield a uniform magnetic field. However, Helmholtz coils tend to take up a much larger volume, for a field of given size and uniformity, than the four-coil system shown. No suitable coil systems other than the four-coil system shown and the Helmholtz coil system are presently known to the inventor, although others conceivably may exist. The relative spacings and number of turns of the coils in the four-coil system are rather difficult to compute. Such four-coil systems are discussed in the Atomic Energy of Canada Limited publication, "Uniform Magnetic Fields" by G. E. Lee-Whiting, February 1957, AECL No. 419, CRT–673. A four-coil system suitable for measurements of the earth's magnetic field is as follows:

Four circular coils, each one having a radius of 5.00 inches, are mounted coaxially and symmetrically. The planes of the two inner coils 33, 34 are separated by a spacing $b$ of 2.432 inches. The planes of the two outer coils 32, 35 are separated by a spacing $(2a+b)$ of 9.408 inches. Each of the inner coils has 50 turns of wire, while the two outer coils have 113 turns of wire. The Helmholtz coils which would produce as uniform a field as the aforementioned four-coil system would be perhaps five feet in diameter, separated by a distance of half the diameter.

Within the coil structure is positioned a plastic bottle 41 which fits inside a coil 42 which is attached via bars 43 to the coil structure. Inside the bottle is the substance used as the precession sample. A suitable precession sample is 500 cc. or more of water. The coil 42 is energized by direct current flowing through leads 44, thereby polarizing the protons or other particles in the sample. The D.C. current is then shut off, whereupon the field produced by the coil 43 (approximately at right angles to the axis of the coils 32, 33, 34, 35) collapses. The protons or other particles then precess in the remaining magnetic field, and the frequency of precession is detected by the coil 43 and transmitted to a frequency-counting device via the leads 44. The frequency measurement is preferably not begun until the magnetic field produced by the coil 43 has completely disappeared. On the other hand, the frequency measurement must be made reasonably quickly or the precession frequency signal will decay into noise. A delay of half a second between the shutting-off of the D.C. current to the coil 43 and the beginning of the frequency measurement is of the correct order of magnitude. The measured frequency may be recorded, or may be indicated on a suitable indicating device for use in mental calculations, or can be transmitted in digital form to a digital computer, where any desired non-mental operations may be made, e.g., the computer may be programmed to use Equation 2 to calculate magnetic field strength.

Equations 1, 8, 9, and 10 may be used to determine the magnitudes of fields F, $F_1$, and $F_2$ if it is desired to measure a component of the magnetic field intensity or the value of the direct current flowing through the coils. The values of F, $F_1$ and $F_2$ may then be used in Equation 2 to measure a component field, or in Equation 7 to measure the field produced by the direct current. In a Helmholtz coil structure, the magnetic field intensity $p$ gauss is related to the direct current I amperes by the equation $$p = \frac{32\pi nI}{50a\sqrt{5}} \qquad (12)$$

where $n$ is the number of turns of wire in each coil, and $a$ is the radius of each coil in centimetres. If a four-coil structure such as that shown in the drawings is used instead of a Helmholtz coil system, is related to I by the equation $$p = \frac{4\pi k}{10} \frac{(n_1+n_2)}{a} I \qquad (13)$$

where $p$ is in gauss, I is in amperes, $n_1$ is the number of turns of wire in the outer coils, $n_2$ is the number of turns of wire in the inner coils, $a$ is the radius of the coil structure in centimetres, and $k$ is a constant depending on the particular coil structure used. For the particular structure described above, $k$ has a value 0.549.

To obtain good accuracy, the field $p$ produced by the coils 32, 33, 34 and 35 should be large enough to make the three frequency measurements $f$, $f_1$, $f_2$ (see Equations 1, 8, 9, 10) differ considerably. However, the larger the field $p$, the greater is the non-uniformity, so that $p$ is preferably kept as small as possible. It can be shown mathematically that a good compromise is to make $p$ approximately equal to F, i.e. to make the field produced by the coils 32, 33, 34 and 35 approximately equal to the total intensity of the earth's magnetic field at the point of interest (assuming that it is desired to measure a component of the earth's field).

For a measurement of the geomagnetic field to be useful, it is necessary to know the direction of the axis of the coil structure 17. The geomagnetic field is represented by three orthogonal components X, Y and Z where X is horizontal and pointing north, Y is horizontal and pointing east, Z is vertical and pointing down (towards the centre of the earth). Normally it is desirable to measure each of the X, Y, and Z components individually. This can be done as follows:

(1) *Measurement of Z*

The coil structure axis is set as near to the vertical as possible.

If the axis of the coil structure 17 departs from the vertical by the angle $u$ in the XZ plane and by the angle $v$ in the YZ plane, the measured component will be $$Z + X \sin u + Y \sin V + Z(1-\cos u) + Z(1-\cos v)$$

Since the angles $u$ and $v$ are small ($<1°$) this may be written $$Z + Xu + Yv - (\tfrac{1}{2})Z(u^2+v^2) \qquad (14)$$

The coil structure 17 is then rotated 180° in azimuth about the vertical axis and the measurement is repeated. The rotation will reverse the sign of both $u$ and $v$ and the second measurement will give $$Z - Xu - Yv - (\tfrac{1}{2})Z(u^2+v^2) \qquad (15)$$

The coil is then rotated 90° in azimuth and a third measurement made:

$$Z - Xv + Yu - (\tfrac{1}{2})Z(u^2+v^2) \qquad (16)$$

The coil is then rotated 180° for a fourth measurement:

$$Z + Xv - Yu - (\tfrac{1}{2})Z(u^2+v^2) \qquad (17)$$

The mean of the first two measurements (14) and (15) is $Z - (\tfrac{1}{2})Z(u^2+v^2)$, the first order error terms having been eliminated. The mean of the third and fourth measurements (16) and (17) is also $Z - (\tfrac{1}{2})Z(u^2+v^2)$. Since X is usually much greater than Y, the difference of the first two readings indicates $u$, and the difference between the third and fourth readings indicates $v$. They can be made as small as desired by adjusting the coil relative to the vertical axis. If $u$ and $v$ are each made less than $\tfrac{1}{4}°$, the second order term is negligibly small—less than $10^{-5}$.

(2) *Measurement of X*

The telescope 36 is aligned as nearly as possible parallel to the axis of the coil structure 17. The plate 15 is levelled. The telescope 36 is sighted on a mark of known azimuth, and the coil is then turned in azimuth through the appropriate angle to make the telescope point North.

If $u$ is the angle between the axis of the coil structure 17 and the horizontal, and $\omega$ is the angle in azimuth between the coil axis and the telescope axis, the first measurement yields $$X + X(1-\cos u) + X(1-\cos \omega) + Y \sin \omega + Z \sin u$$
$$\approx X - (\tfrac{1}{2})X(u^2+\omega^2) + Y\omega + Zu \qquad (18)$$

The telescope is then pointed South and a second measurement gives $$X - (\tfrac{1}{2})X(u^2+\omega^2) + Y\omega - Zu \qquad (19)$$

The coil and telescope assembly is then inverted. If the angle between the coil axis and the horizontal is now $v$, with the telescope poining North, we obtain $$X - (\tfrac{1}{2})X(v^2+\omega^2) - Y\omega + Zv \qquad (20)$$

and with the telescope pointing South, we obtain $$X - (\tfrac{1}{2})X(v^2+\omega^2) - Y\omega - Zv \qquad (21)$$

The mean of the first two readings is $$X - (\tfrac{1}{2})X(u^2+\omega^2) + Y\omega$$

and their difference is an indication of $u$, which should be adjusted to less than $\tfrac{1}{4}°$.

The mean of the third and fourth readings is $$X - (\tfrac{1}{2})X(v^2+\omega^2) - Y\omega$$

and their difference is an indication of $v$, which should be made small. The difference between the two means indicates $\omega$, which should be made small. The mean of the four readings is then $X - (\tfrac{1}{4})X(u^2+v^2+2\omega^2)$, first order errors having been eliminated. If $u$, $v$ and $\omega$ are made less than $\tfrac{1}{4}°$, the error is less than 1 part in $10^5$.

(3) *Measurement of Y*

This is entirely analogous to the measurement of X. The telescope is pointed East and West.

What I claim as my invention is:

1. A method of measuring a component of a quiescent magnetic field, comprising the first two steps of producing only a first uniform auxiliary magnetic field in a first direction and measuring the magnitude $F_1$ of the intensity of the magnetic field resulting from the vector sum of the quiescent magnetic field and the first auxiliary magnetic field; and producing only a second uniform auxiliary magnetic field equal in intensity to the intensity of the first auxiliary field and in the direction opposite to the first direction and measuring the magnitude $F_2$ of the intensity of the magnetic field resulting from the vector sum of the quiescent magnetic field and the second auxiliary magnetic field; and the third step, taken in any order relative to the first two steps, of measuring the magnitude F of the intensity of the quiescent magnetic field; and using the values obtained to calculate by non-mental means a component of the quiescent magnetic field; wherein the first auxiliary magnetic field is produced by flow of a first direct current in one direction through a plurality of coils of wire and the second auxiliary magnetic field is produced by flow of a second direct current equal in magnitude to the first direct current and in the opposite direction to the said one direction through the said coils of wire.

2. A method as claimed in claim 1, wherein the auxiliary magnetic fields are of the same order of magnitude as the quiescent magnetic field.

3. A method as claimed in claim 1, comprising additionally calculating by non-mental means the value of the intensity P of the component of the quiescent field in the first direction by means of the relationship $$P = \frac{(F_1^2 - F_2^2)}{4\sqrt{\frac{F_1^2 + F_2^2}{2} - F^2}}$$

4. A method as claimed in claim 1, comprising additionally calculating by non-mental means the value of the intensity $p$ of the first auxiliary magnetic field by means of the relationship $$p = \sqrt{\frac{F_1^2 + F_2^2}{2} - F^2}$$

5. A method as claimed in claim 1, comprising additionally calculating by non-mental means the value of the magnitude of the first direct current by means of the known relationship between the magnitude of the first direct current, and the value of the intensity $p$ of the first auxiliary magnetic field, and the relationship $$p = \sqrt{\frac{F_1^2 + F_2^2}{2} - F^2}$$

6. A method of measuring a component of a quiescent magnetic field using an atomic precession magnetometer having a precession sample, comprising the first two steps of producing a first uniform auxiliary magnetic field in a first direction and measuring a frequency of precession $f_1$ when the precession sample is placed in the magnetic field which is the vector sum of the quiescent magnetic field and the first auxiliary magnetic field, and producing a second uniform auxiliary magnetic field equal in intensity to the intensity of the first auxiliary field and in the direction opposite to the first direction and measuring the frequency of precession $f_2$ when the precession sample is placed in the magnetic field which is the vector sum of the quiescent magnetic field and the second auxiliary magnetic field; and the third step, taken in any order relative to the first two steps, of measuring the frequency of precession $f$ when the precession sample is placed in the quiescent magnetic field; and using the values obtained to calculate by non-mental means a component of the quiescent magnetic field; wherein the first auxiliary magnetic field is produced by flow of a first direct current in one direction through a plurality of coils of wire, and the second auxiliary magnetic field is produced by flow of a second direct current equal in magnitude to the first direct current and in the opposite direction to the said one direction through the said coils of wire.

7. A method as claimed in claim 6, comprising additionally converting by non-mental means each of the measured frequencies, $f$, $f_1$, and $f_2$ into corresponding measurements of magnetic field intensity, F, $F_1$ and $F_2$ using the known relationship between frequency of precession, gyromagnetic ratio and magnetic field intensity.

8. A method as claimed in claim 7, comprising additionally calculating by non-mental means the value of the intensity P of the component of the quiescent field in the first direction by means of the relationship $$P = \frac{(F_1^2 + F_2^2)}{4\sqrt{\frac{F_1^2 + F_2^2}{2} - F^2}}$$

9. A method as claimed in claim 7, comprising additionally calculating by non-mental means the value of the intensity $p$ of the first auxiliary magnetic field by means of the relationship $$p = \sqrt{\frac{F_1^2 + F_2^2}{2} - F^2}$$

10. A method as claimed in claim 7, comprising additionally calculating by non-mental means the value of the magnitude of the first direct current by means of the known relationship between the magnitude of the first direct current and the value of the intensity $p$ of the first auxiliary magnetic field, and the relationship $$p = \sqrt{\frac{F_1^2 + F_2^2}{2} - F^2}$$

11. A method as claimed in claim 6, wherein the auxiliary magnetic fields are of the same order of magnitude as the quiescent magnetic field.

12. A method of measuring a component of a quiescent magnetic field using an atomic precession magnetometer having a precession sample, comprising the first two steps of producing a first uniform auxiliary magnetic field in a first direction and measuring the frequency of precession $f_1$ when the precession sample is placed in the magnetic field which is the vector sum of the quiescent magnetic field and the first auxiliary magnetic field, and producing a second uniform auxiliary magnetic field equal in intensity to the intensity of the first auxiliary field and in the direction opposite to the first direction and measuring the frequency of precession $f_2$ when the precession sample is placed in the magnetic field which is the vector sum of the quiescent magnetic field and the second auxiliary magnetic field; and the third step, taken in any order relative to the first two steps, of measuring the frequency of precession $f$ when the precession sample is placed in the quiescent magnetic field; and using the values obtained to calculate by non-mental means a component of the quiescent magnetic field; wherein the first auxiliary magnetic field is produced by flow of a first known direct current in one direction through a plurality of coils of wire, and the second auxiliary magnetic field is produced by flow of a second known direct current equal in magnitude to the first direct current and in the opposite direction to the said one direction through the said coils of wire.

13. A method as claimed in claim 12, comprising additionally calculating by non-mental means the gyromagnetic ratio $\gamma$ of the precessing particles in the precession sample by means of the known relationship between the said first direct current and the value of the intensity $p$ of the first auxiliary magnetic field, and the equation $$\gamma = \sqrt{\frac{2\pi^2}{p^2}(f_1^2 + f_2^2 - 2f^2)}$$

References Cited in the file of this patent

UNITED STATES PATENTS 2,916,690    Leete               Dec. 8, 1959
2,975,360    Bell                Mar. 14, 1961

FOREIGN PATENTS 746,114    Great Britain          Mar. 7, 1956

OTHER REFERENCES

Brown—Physical Review—vol. 78, No. 5, June 1, 1950—pp. 530 to 532.

Hurwitz et al.—Journal of Geophysical Research—vol. 65, No. 6, June 1960—pp. 1759 to 1865 incl. (Manuscript received Feb. 16, 1960. Copy of publication received in U.S. Geological Survey Library, Washington, June 17, 1960.)